(12) United States Patent
Sankuratri et al.

(10) Patent No.: US 9,075,560 B2
(45) Date of Patent: Jul. 7, 2015

(54) REAL-TIME COMPRESSION WITH GPU/CPU

(75) Inventors: Sridhar Sankuratri, Campbell, CA (US); B. Anil Kumar, Saratoga, CA (US); Vladimir Stoyanov, Redmond, WA (US); Jeff B. Widergren, Mountain View, CA (US); Hon Luu, San Jose, CA (US); Damien Gerard Saint Macary, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1130 days.

(21) Appl. No.: 12/635,628

(22) Filed: Dec. 10, 2009

(65) Prior Publication Data

US 2011/0141133 A1   Jun. 16, 2011

(51) Int. Cl.
| | |
|---|---|
| G06F 13/14 | (2006.01) |
| G06T 1/00 | (2006.01) |
| G06F 3/14 | (2006.01) |
| H04N 19/172 | (2014.01) |
| H04N 19/63 | (2014.01) |
| H04N 19/132 | (2014.01) |
| H04N 19/164 | (2014.01) |
| H04N 19/18 | (2014.01) |
| H04N 19/42 | (2014.01) |
| H04N 19/507 | (2014.01) |

(52) U.S. Cl.
CPC ............... *G06F 3/1454* (2013.01); *G06F 3/14* (2013.01); *G09G 2310/04* (2013.01); *G09G 2320/10* (2013.01); *G09G 2340/02* (2013.01); *G09G 2350/00* (2013.01); *G09G 2360/08* (2013.01); *H04N 19/172* (2014.11); *H04N 19/63* (2014.11); *H04N 19/132* (2014.11); *H04N 19/164* (2014.11); *H04N 19/18* (2014.11); *H04N 19/42* (2014.11); *H04N 19/507* (2014.11)

(58) Field of Classification Search
None
See application file for complete search history.

(56) References Cited

U.S. PATENT DOCUMENTS

| | | |
|---|---|---|
| 6,222,883 B1 | 4/2001 | Murdock et al. |
| 6,807,308 B2 | 10/2004 | Chui et al. |
| 7,024,046 B2 | 4/2006 | Dekel et al. |

(Continued)

FOREIGN PATENT DOCUMENTS

JP   2007/104692   4/2007

OTHER PUBLICATIONS

Holtz, K. et al., "Autosophy Internet Video," *IS&T/SPIE 2002, Internet Imaging III*, Dec. 20, 2001, 4672, 1-13.

(Continued)

*Primary Examiner* — Tize Ma
(74) *Attorney, Agent, or Firm* — Bryan Webster; Kate Drakos; Micky Minhas

(57) ABSTRACT

Example embodiments of the present disclosure provide techniques for efficiently processing and transmitting graphics data when sub-regions of the screen represented by the graphics data are updated at different relative update rates. In an embodiment, when the screen is divided into tiles and a plurality of the tiles have been determined as being changed, some of the sublevels resulting from the image transform may not be encoded and transmitted. The decoding process may use zeroes for any data not received. The rendering subsystem may render the image with the partial data, and the remaining data may be received in subsequent transmissions.

20 Claims, 15 Drawing Sheets

(56) References Cited

U.S. PATENT DOCUMENTS

| | | |
|---|---|---|
| 7,158,571 B2 | 1/2007 | Wang et al. |
| 7,215,820 B2 | 5/2007 | Zandi et al. |
| 7,460,725 B2 | 12/2008 | Malladi et al. |
| 7,558,428 B2 | 7/2009 | Shen et al. |
| 2005/0100234 A1* | 5/2005 | Ferriere ............... 382/240 |
| 2007/0097130 A1* | 5/2007 | Margulis ............... 345/501 |
| 2007/0110303 A1* | 5/2007 | Bhattacharjya et al. ...... 382/166 |
| 2008/0126278 A1* | 5/2008 | Bronstein et al. ............ 706/17 |
| 2008/0304738 A1 | 12/2008 | Beilloin |
| 2009/0002569 A1 | 1/2009 | Matsukura et al. |
| 2009/0274378 A1* | 11/2009 | Fukuhara et al. ............ 382/232 |

OTHER PUBLICATIONS

Sikora, T., "Trends and Perspectives in Image and Video Coding," *Proceedings of the IEEE*, (Manuscript received Jan. 18, 2004 and revised Jul. 21, 2004), Jan. 2005, 93(1), 6-17.

* cited by examiner ically compressed by the server, transmitted from the server to the client through a network, and decompressed by the client and displayed on the local user display. Various schemes may be used to minimize the size of the graphics data that needs to be transmitted. One such scheme may include dividing the graphics data into tiles and sending only the tiles that have changed since a previous transmission. However, the changed tiles still need to be encoded and transmitted, typically requiring significant network bandwidth and a significant number of processor computation cycles to compress and decompress the tiles. Such processing requirements may have a direct effect on the data transmission/decoding latency from the server to the client and negatively impact the remote user's experience.

REAL-TIME COMPRESSION WITH GPU/CPU

BACKGROUND

Remote computing systems can enable users to remotely access hosted resources. Servers on the remote computing systems can execute programs and transmit signals indicative of a user interface to clients that can connect by sending signals over a network conforming to a communication protocol such as the TCP/IP protocol. Each connecting client may be provided a remote presentation session, i.e., an execution environment that includes a set of resources. Each client can transmit signals indicative of user input to the server and the server can apply the user input to the appropriate session. The clients may use remote presentation protocols such as the Remote Desktop Protocol (RDP) to connect to a server resource.

In the remote desktop environment, data representing graphics to be transmitted to the client are typically compressed by the server, transmitted from the server to the client through a network, and decompressed by the client and displayed on the local user display. Various schemes may be used to minimize the size of the graphics data that needs to be transmitted. One such scheme may include dividing the graphics data into tiles and sending only the tiles that have changed since a previous transmission. However, the changed tiles still need to be encoded and transmitted, typically requiring significant network bandwidth and a significant number of processor computation cycles to compress and decompress the tiles. Such processing requirements may have a direct effect on the data transmission/decoding latency from the server to the client and negatively impact the remote user's experience.

Thus, additional techniques are needed in the art to solve the above described problems.

SUMMARY

One problem with scalable encoding is the scenario where the changed areas of a screen are not fully aligned on a tile when the tiles are a predetermined size. For example, a tile may comprise both video and text portions or sub-regions. Treating the entire tile as a slow changing text portion may result in the system being unable to provide updates fast enough to keep up with the faster changing video portion. Treating the entire tile as fast changing may result in the text portion being rendered with a lesser quality image. When an algorithm for scalable encoding is performed, the higher fidelity image may appear to be fuzzy because only the high frequency components may be sent as a result of the video being repeatedly updated.

In various embodiments, methods and systems are disclosed for efficiently processing and transmitting graphics data when sub-regions of the screen represented by the graphics data are updated at different relative update rates. In an embodiment, when the screen is divided into tiles and a plurality of the tiles have been determined as being changed, it may not be necessary to perform processing/encoding for all of the image data. For example, if discrete wavelet transformation is used, then some of the sublevels resulting from the discrete wavelet transform may not be encoded and transmitted. The decoding process may use zeroes for any data not received. The rendering subsystem may render the image with the partial data, and the remaining data may be received in subsequent transmissions. After the remaining data have been decoded and rendered, the image may be completely rendered. Accordingly, a lower latency can be achieved while producing a full image by avoiding performing compression when the image is rapidly changing.

In an embodiment, the GPU may be used as an offload engine to assist in the compression processing tasks. For example, the GPU may be used as a coprocessor to assist in the compression process. The concurrent processing of data on the GPU and CPU may provide for lower latency in the end-to-end process.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The systems, methods, and computer readable media for altering a view perspective within a virtual environment in accordance with this specification are further described with reference to the accompanying drawings in which.

The systems, methods, and computer readable media for altering a view perspective within a virtual environment in accordance with this specification are further described with reference to the accompanying drawings in which.

DETAILED DESCRIPTION

Computing Environments in General Terms

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1:
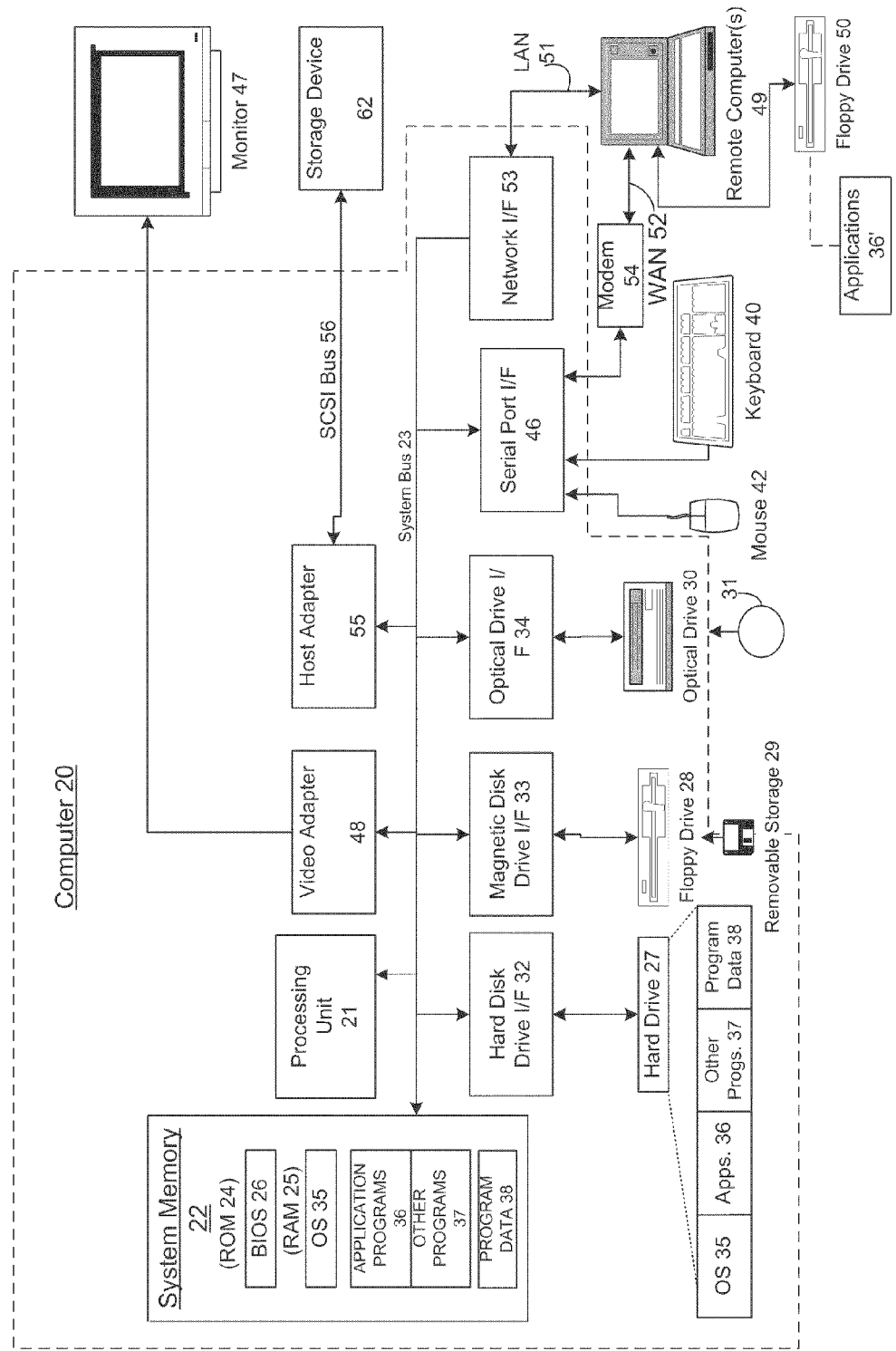
FIGS. 1 and 2 depict an example computer system wherein aspects of the present disclosure can be implemented.
Figure 2:
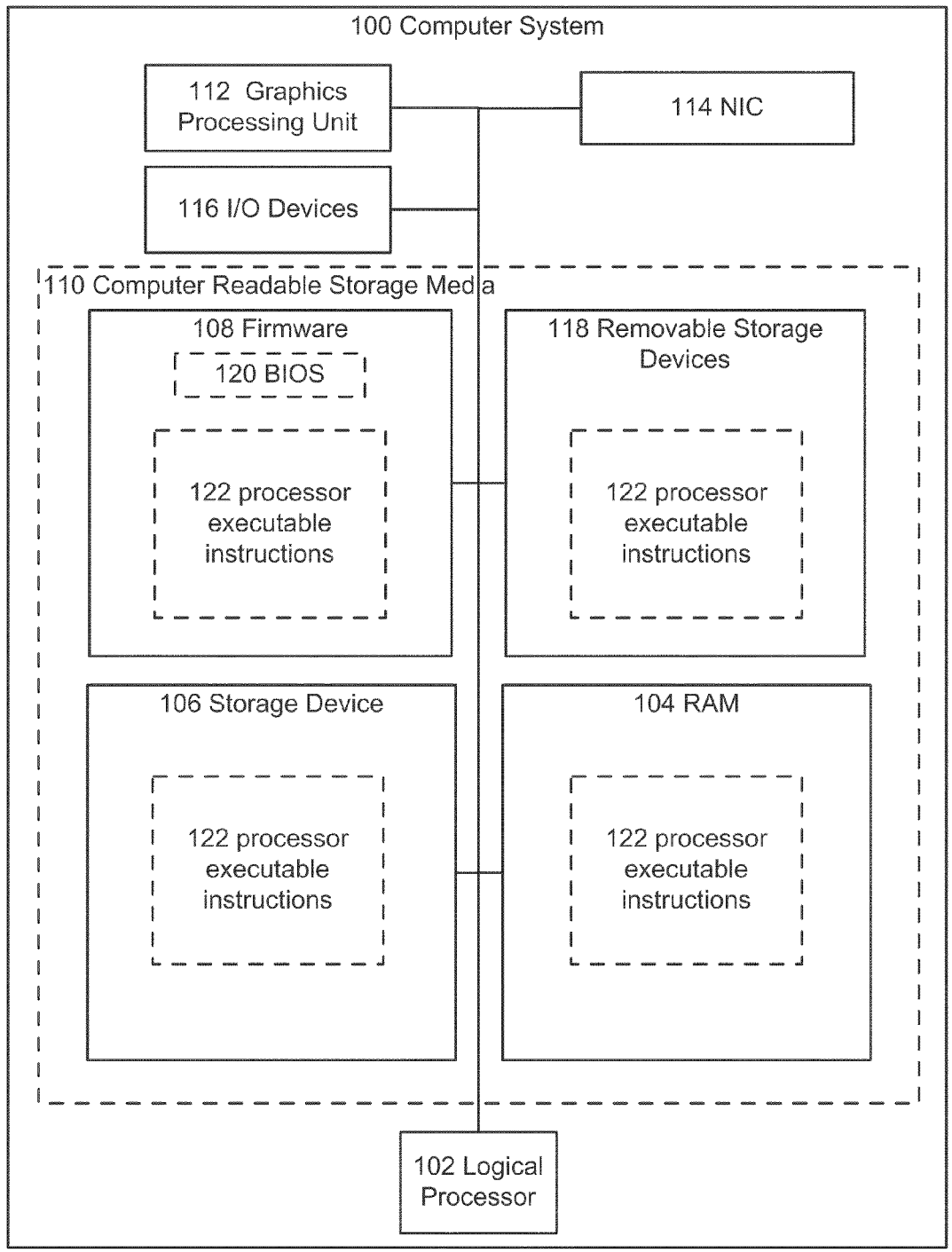

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client Embodiments may execute on one or more computers. FIGS. 1 and 2 and the following discussion are intended to provide a brief general description of a suitable computing environment in which the disclosure may be implemented. One skilled in the art can appreciate that computer systems 200, 300 can have some or all of the components described with respect to computer 100 of FIGS. 1 and 2.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is trivial and left to an implementer.

FIG. 1 depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, a virtual machine, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the disclosure are particularly well-suited for computer systems, nothing in this document is intended to limit the disclosure to such embodiments.

Referring now to FIG. 2, another embodiment of an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges.

The computer readable storage media provide non volatile storage of processor executable instructions 122, data structures, program modules and other data for the computer 100. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

A remote desktop system is a computer system that maintains applications that can be remotely executed by client computer systems. Input is entered at a client computer system and transferred over a network (e.g., using protocols based on the International Telecommunications Union (ITU) T.120 family of protocols such as Remote Desktop Protocol (RDP)) to an application on a terminal server. The application processes the input as if the input were entered at the terminal server. The application generates output in response to the received input and the output is transferred over the network to the client computer system. The client computer system presents the output data. Thus, input is received and output presented at the client computer system, while processing actually occurs at the terminal server. A session can include a shell and a user interface such as a desktop, the subsystems that track mouse movement within the desktop, the subsystems that translate a mouse click on an icon into commands that effectuate an instance of a program, etc. In another example embodiment the session can include an application. In this example while an application is rendered, a desktop environment may still be generated and hidden from the user. It should be understood that the foregoing discussion is exemplary and that the presently disclosed subject matter may be implemented in various client/server environments and not limited to a particular terminal services product.

In most, if not all remote desktop environments, input data (entered at a client computer system) typically includes mouse and keyboard data representing commands to an application and output data (generated by an application at the terminal server) typically includes video data for display on a video output device. Many remote desktop environments also include functionality that extend to transfer other types of data.

Communications channels can be used to extend the RDP protocol by allowing plug-ins to transfer data over an RDP connection. Many such extensions exist. Features such as printer redirection, clipboard redirection, port redirection, etc., use communications channel technology. Thus, in addition to input and output data, there may be many communications channels that need to transfer data. Accordingly, there may be occasional requests to transfer output data and one or more channel requests to transfer other data contending for available network bandwidth.

Figure 3:
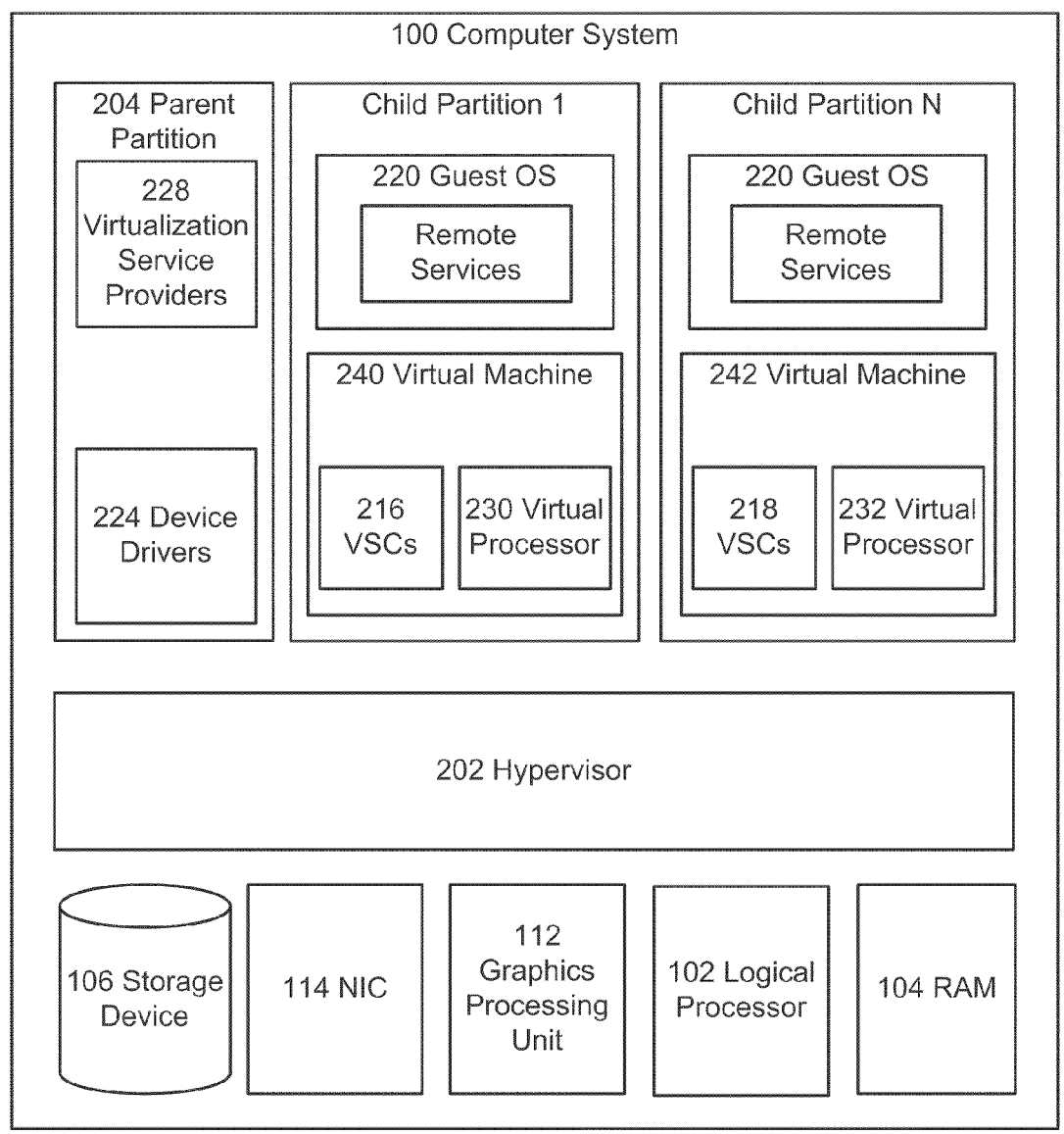
FIG. 3 depicts an operational environment for practicing aspects of the present disclosure.
Figure 4:
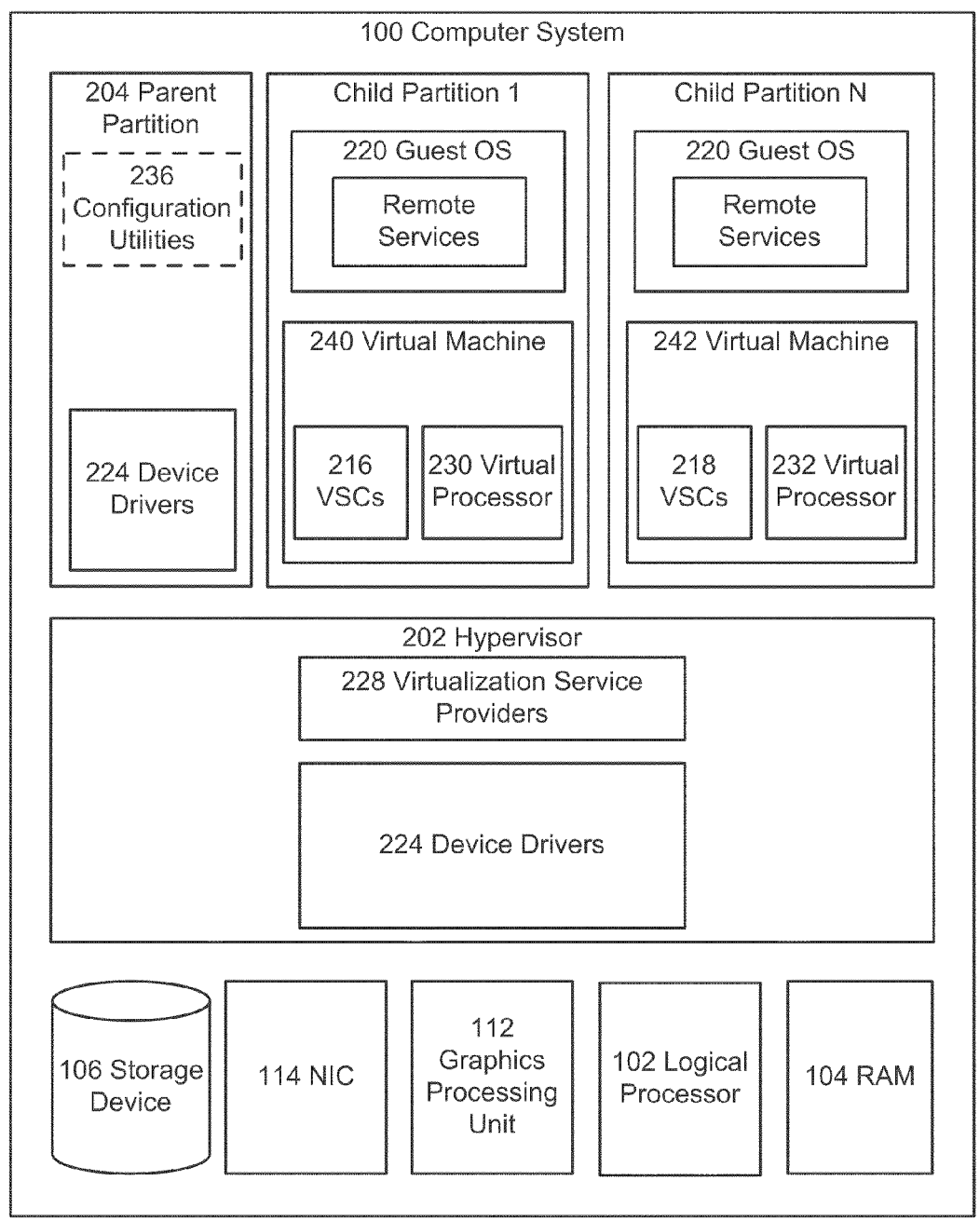
FIG. 4 depicts an operational environment for practicing aspects of the present disclosure.

Referring now to FIGS. 3 and 4, depicted are high level block diagrams of computer systems configured to effectuate virtual machines. As shown in the figures, computer system 100 can include elements described in FIGS. 1 and 2 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service providers 228 (VSPs) that are also known as back-end drivers in the open source community. In this example architecture the parent partition 204 can gate access to the underlying hardware. The VSPs 228 can be used to multiplex the interfaces to the hardware resources by way of virtualization service clients (VSCs) that are also known as front-end drivers in the open source community. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors, various VSCs, and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

Referring now to FIG. 4, illustrated is an alternative architecture that can be used to effectuate virtual machines. FIG. 4 depicts similar components to those of FIG. 3, however in this example embodiment the hypervisor 202 can include the virtualization service providers 228 and device drivers 224, and parent partition 204 may contain configuration utilities 236. In this architecture, hypervisor 202 can perform the same or similar functions as the hypervisor 202 of FIG. 2. The hypervisor 202 of FIG. 4 can be a stand alone software product, a part of an operating system, embedded within firmware of the motherboard or a portion of hypervisor 202 can be effectuated by specialized integrated circuits. In this example parent partition 204 may have instructions that can be used to configure hypervisor 202 however hardware access requests may be handled by hypervisor 202 instead of being passed to parent partition 204.

Figure 5:
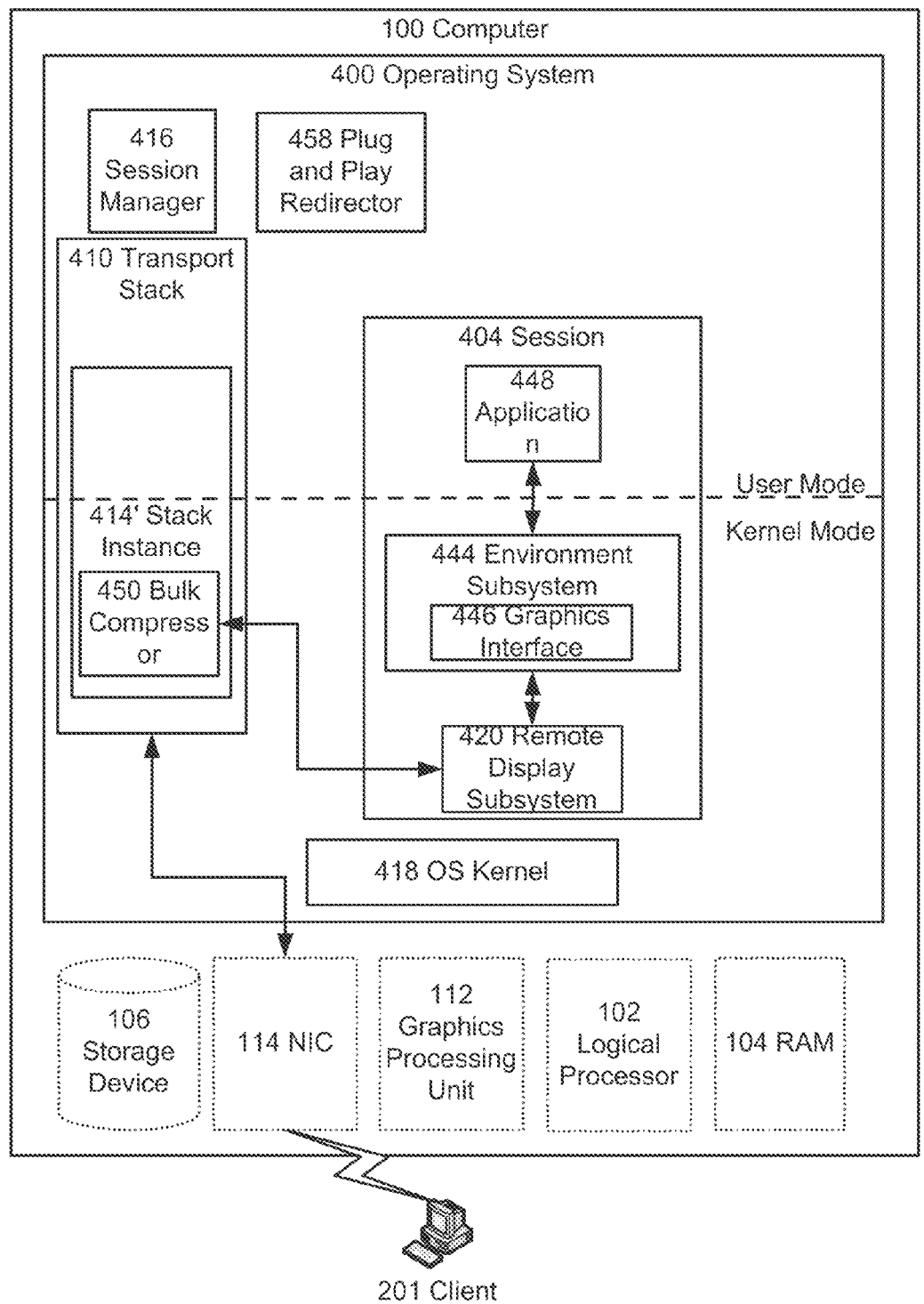
FIG. 5 illustrates a computer system including circuitry for effectuating remote desktop services.

Referring now to FIG. 5, computer 100 may include circuitry configured to provide remote desktop services to connecting clients. In an example embodiment, the depicted operating system 400 may execute directly on the hardware or a guest operating system 220 or 222 may be effectuated by a virtual machine such as VM 216 or VM 218. The underlying hardware 208, 210, 234, 212, and 214 is indicated in the illustrated type of dashed lines to identify that the hardware can be virtualized.

Remote services can be provided to at least one client such as client 401 (while one client is depicted remote services can be provided to more clients.) The example client 401 can include a computer terminal that is effectuated by hardware configured to direct user input to a remote server session and display user interface information generated by the session. In another embodiment, client 401 can be effectuated by a computer that includes similar elements as those of computer 100 FIG. 1b. In this embodiment, client 401 can include circuitry configured to effect operating systems and circuitry configured to emulate the functionality of terminals, e.g., a remote desktop client application that can be executed by one or more logical processors 102. One skilled in the art can appreciate that the circuitry configured to effectuate the operating system can also include circuitry configured to emulate a terminal.

Each connecting client can have a session (such as session 404) which allows the client to access data and applications stored on computer 100. Generally, applications and certain operating system components can be loaded into a region of memory assigned to a session. Thus, in certain instances some OS components can be spawned N times (where N represents the number of current sessions). These various OS components can request services from the operating system kernel 418 which can, for example, manage memory; facilitate disk reads/writes; and configure threads from each session to execute on the logical processor 102. Some example subsystems that can be loaded into session space can include the subsystems that generates desktop environments, the subsystems that track mouse movement within the desktop, the subsystems that translate mouse clicks on icons into commands that effectuate an instance of a program, etc. The processes that effectuate these services, e.g., tracking mouse movement, are tagged with an identifier associated with the session and are loaded into a region of memory that is allocated to the session.

A session can be generated by a session manager 416, e.g., a process. For example, the session manager 416 can initialize and manage each remote session by generating a session identifier for a session space; assigning memory to the session space; and generating system environment variables and instances of subsystem processes in memory assigned to the session space. The session manager 416 can be invoked when a request for a remote desktop session is received by the operating system 400.

A connection request can first be handled by a transport stack 410, e.g., a remote desktop protocol (RDP) stack. The transport stack 410 instructions can configure logical processor 102 to listen for connection messages on a certain port and forward them to the session manager 416. When sessions are generated the transport stack 410 can instantiate a remote desktop protocol stack instance for each session. Stack instance 414 is an example stack instance that can be generated for session 404. Generally, each remote desktop protocol stack instance can be configured to route output to an associated client and route client input to an environment subsystem 444 for the appropriate remote session.

As shown by the figure, in an embodiment an application 448 (while one is shown others can also execute) can execute and generate an array of bits. The array can be processed by a graphics interface 446 which in turn can render bitmaps, e.g., arrays of pixel values, that can be stored in memory. As shown by the figure, a remote display subsystem 420 can be instantiated which can capture rendering calls and send the calls over the network to client 401 via the stack instance 414 for the session.

In addition to remoting graphics and audio, a plug and play redirector 458 can also be instantiated in order to remote diverse devices such as printers, mp3 players, client file systems, CD ROM drives, etc. The plug and play redirector 458 can receive information from a client side component which identifies the peripheral devices coupled to the client 401. The plug and play redirector 458 can then configure the operating system 400 to load redirecting device drivers for the peripheral devices of the client 401. The redirecting device drivers can receive calls from the operating system 400 to access the peripherals and send the calls over the network to the client 401.

As discussed above, clients may use a protocol for providing remote presentation services such as Remote Desktop Protocol (RDP) to connect to a resource using terminal services. When a remote desktop client connects to a terminal server via a terminal server gateway, the gateway may open a socket connection with the terminal server and redirect client traffic on the remote presentation port or a port dedicated to remote access services. The gateway may also perform certain gateway specific exchanges with the client using a terminal server gateway protocol transmitted over HTTPS.

Figure 6:
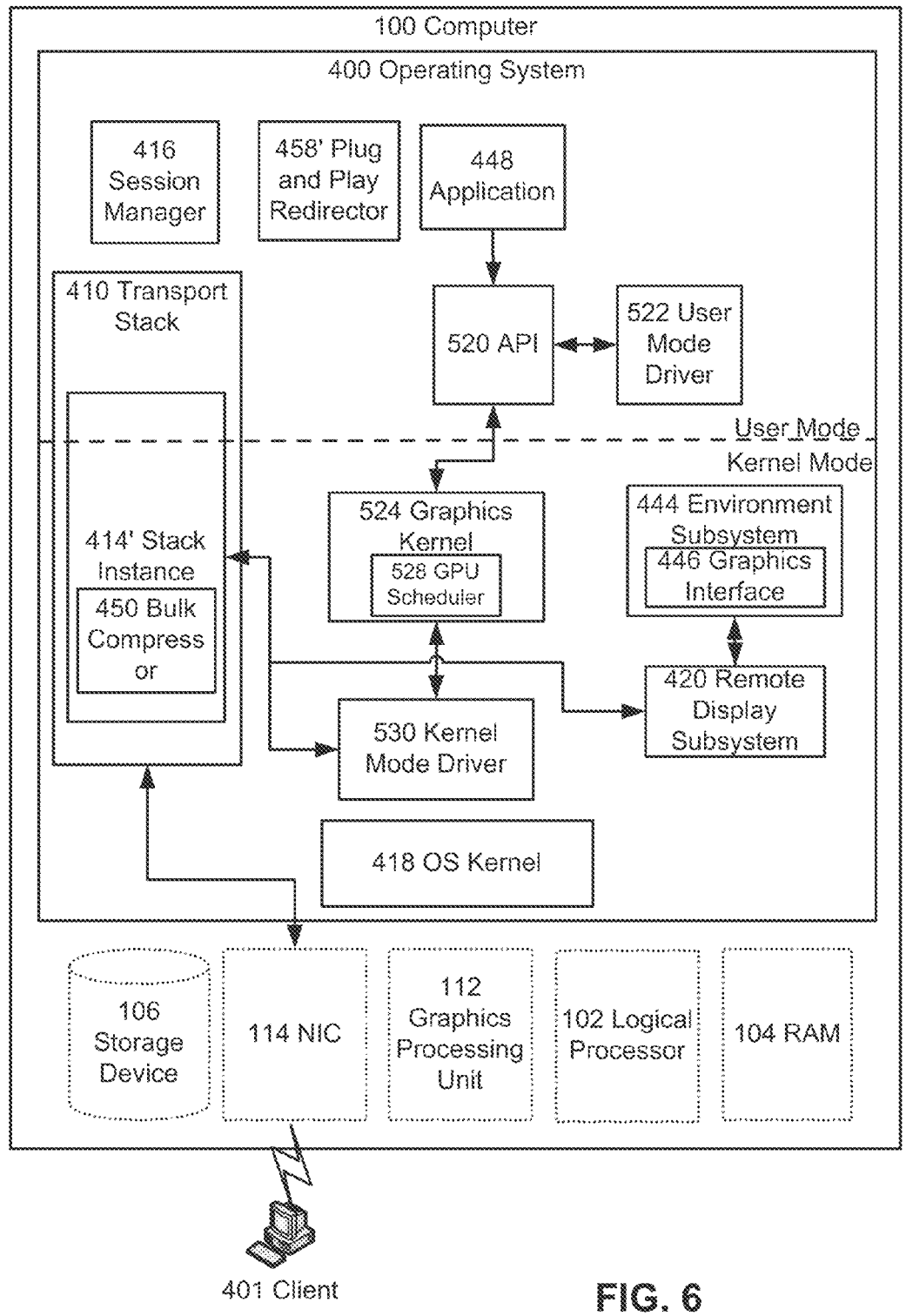
FIG. 6 illustrates a computer system including circuitry for effectuating remote services.

Turning to FIG. 6, depicted is a computer system 100 including circuitry for effectuating remote services and for incorporating aspects of the present disclosure. As shown by the figure, in an embodiment a computer system 100 can include components similar to those described in FIG. 2 and FIG. 5, and can effectuate a remote presentation session. In an embodiment of the present disclosure a remote presentation session can include aspects of a console session, e.g., a session spawned for a user using the computer system, and a remote session. Similar to that described above, the session manager 416 can initialize and manage the remote presentation session by enabling/disabling components in order to effectuate a remote presentation session.

One set of components that can be loaded in a remote presentation session are the console components that enable high fidelity remoting, namely, the components that take advantage of 3D graphics and 2D graphics rendered by 3D hardware.

3D/2D graphics rendered by 3D hardware can be accessed using a driver model that includes a user mode driver 522, an API 520, a graphics kernel 524, and a kernel mode driver 530. An application 448 (or any other process such as a user interface that generates 3D graphics) can generate API constructs and send them to an application programming interface 520 (API) such as Direct3D from Microsoft®. The API 520 in turn can communicate with a user mode driver 522 which can generates primitives, e.g., the fundamental geometric shapes used in computer graphics represented as vertices and constants which are used as building blocks for other shapes, and stores them in buffers, e.g., pages of memory. In one embodiment the application 448 can declare how it is going to use the buffer, e.g., what type of data it is going to store in the buffer. An application, such as a videogame, may use a dynamic buffer to store primitives for an avatar and a static buffer for storing data that will not change often such as data that represents a building or a forest.

Continuing with the description of the driver model, the application can fill the buffers with primitives and issue execute commands. When the application issues an execute command the buffer can be appended to a run list by the kernel mode driver 530 and scheduled by the graphics kernel scheduler 528. Each graphics source, e.g., application or user interface, can have a context and its own run list. The graphics kernel 524 can be configured to schedule various contexts to execute on the graphics processing unit 112. The GPU scheduler 528 can be executed by logical processor 102 and the scheduler 528 can issue a command to the kernel mode driver 530 to render the contents of the buffer. The stack instance 414 can be configured to receive the command and send the contents of the buffer over the network to the client 401 where the buffer can be processed by the GPU of the client.

Illustrated now is an example of the operation of a virtualized GPU as used in conjunction with an application that calls for remote presentation services. Referring to FIG. 6, in an embodiment a virtual machine session can be generated by a computer 100. For example, a session manager 416 can be executed by a logical processor 102 and a remote session that includes certain remote components can be initialized. In this example the spawned session can include a kernel 418, a graphics kernel 524, a user mode display driver 522, and a kernel mode display driver 530. The user mode driver 522 can generate graphics primitives that can be stored in memory. For example, the API 520 can include interfaces that can be exposed to processes such as a user interface for the operating system 400 or an application 448. The process can send high level API commands such as such as Point Lists, Line Lists, Line Strips, Triangle Lists, Triangle Strips, or Triangle Fans, to the API 420. The API 520 can receive these commands and translate them into commands for the user mode driver 522 which can then generate vertices and store them in one or more buffers. The GPU scheduler 528 can run and determine to render the contents of the buffer. In this example the command to the graphics processing unit 112 of the server can be captured and the content of the buffer (primitives) can be sent to client 401 via network interface card 114. In an embodiment, an API can be exposed by the session manager 416 that components can interface with in order to determine whether a virtual GPU is available.

In an embodiment a virtual machine such as virtual machine 240 of FIG. 3 or 4 can be instantiated and the virtual machine can serve as a platform for execution for the operating system 400. Guest operating system 220 can embody operating system 400 in this example. A virtual machine may be instantiated when a connection request is received over the network. For example, the parent partition 204 may include an instance of the transport stack 410 and may be configured to receive connection requests. The parent partition 204 may initialize a virtual machine in response to a connection request along with a guest operating system including the capabilities to effectuate remote sessions. The connection request can then be passed to the transport stack 410 of the guest operating system 220. In this example each remote session may be instantiated on an operating system that is executed by its own virtual machine.

In one embodiment a virtual machine can be instantiated and a guest operating system 220 embodying operating system 400 can be executed. Similar to that described above, a virtual machine may be instantiated when a connection request is received over the network. Remote sessions may be generated by an operating system. The session manager 416 can be configured to determine that the request is for a session that supports 3D graphics rendering and the session manager 416 can load a console session. In addition to loading the console session the session manager 416 can load a stack instance 414' for the session and configure system to capture primitives generated by a user mode display driver 522.

The user mode driver 522 may generate graphics primitives that can be captured and stored in buffers accessible to the transport stack 410. A kernel mode driver 530 can append the buffers to a run list for the application and a GPU scheduler 528 can run and determine when to issue render commands for the buffers. When the scheduler 528 issues a render command the command can be captured by, for example, the kernel mode driver 530 and sent to the client 401 via the stack instance 414'.

The GPU scheduler 528 may execute and determine to issue an instruction to render the content of the buffer. In this example the graphics primitives associated with the instruction to render can be sent to client 401 via network interface card 114.

In an embodiment, at least one kernel mode process can be executed by at least one logical processor 112 and the at least one logical processor 112 can synchronize rendering vertices stored in different buffers. For example, a graphics processing scheduler 528, which can operate similarly to an operating system scheduler, can schedule GPU operations. The GPU scheduler 528 can merge separate buffers of vertices into the correct execution order such that the graphics processing unit of the client 401 executes the commands in an order that allows them to be rendered correctly.

One or more threads of a process such as a videogame may map multiple buffers and each thread may issue a draw command. Identification information for the vertices, e.g., information generated per buffer, per vertex, or per batch of vertices in a buffer, can be sent to the GPU scheduler 528. The information may be stored in a table along with identification information associated with vertices from the same, or other processes and used to synchronize rendering of the various buffers.

An application such as a word processing program may execute and declare, for example, two buffers—one for storing vertices for generating 3D menus and the other one storing commands for generating letters that will populate the menus. The application may map the buffer and; issue draw commands. The GPU scheduler 528 may determine the order for executing the two buffers such that the menus are rendered along with the letters in a way that it would be pleasing to look at. For example, other processes may issue draw commands at the same or a substantially similar time and if the vertices were not synchronized vertices from different threads of different processes could be rendered asynchronously on the client 401 thereby making the final image displayed seem chaotic or jumbled.

A bulk compressor 450 can be used to compress the graphics primitives prior to sending the stream of data to the client 401. In an embodiment the bulk compressor 450 can be a user mode (not shown) or kernel mode component of the stack instance 414 and can be configured to look for similar patterns within the stream of data that is being sent to the client 401. In this embodiment, since the bulk compressor 450 receives a stream of vertices, instead of receiving multiple API constructs, from multiple applications, the bulk compressor 450 has a larger data set of vertices to sift through in order to find opportunities to compress. That is, since the vertices for a plurality of processes are being remoted, instead of diverse API calls, there is a larger chance that the bulk compressor 450 will be able to find similar patterns in a given stream.

In an embodiment, the graphics processing unit 112 may be configured to use virtual addressing instead of physical addresses for memory. Thus, the pages of memory used as buffers can be paged to system RAM or to disk from video memory. The stack instance 414' can be configured to obtain the virtual addresses of the buffers and send the contents from the virtual addresses when a render command from the graphics kernel 528 is captured.

An operating system 400 may be configured, e.g., various subsystems and drivers can be loaded to capture primitives and send them to a remote computer such as client 401. Similar to that described above, a session manager 416 can be executed by a logical processor 102 and a session that includes certain remote components can be initialized. In this example the spawned session can include a kernel 418, a graphics kernel 524, a user mode display driver 522, and a kernel mode display driver 530.

A graphics kernel may schedule GPU operations. The GPU scheduler 528 can merge separate buffers of vertices into the correct execution order such that the graphics processing unit of the client 401 executes the commands in an order that allows them to be rendered correctly.

All of these variations for implementing the above mentioned partitions are just exemplary implementations, and nothing herein should be interpreted as limiting the disclosure to any particular virtualization aspect.

Real-Time Compression

In virtual desktop or remote presentation session, the user graphics and video are rendered at the server for each user. The resulting bitmaps may then be sent to the client for display and interaction. To reduce the bandwidth requirements on the network, bitmaps may be compressed before sending to the client. It is desirable that the compression technique be efficient with low latency.

One issue that may arise is providing efficient bandwidth usage when parts of the screen are updated often such as, for example, when playing back video or animation. Another issue is the tracking of areas of the screen that have different update speeds. It is desirable in such situations to support staged encoding and thus reduce the bandwidth usage. For example, video or animation playback may be embedded in a window that contains high resolution content surrounding the video (e.g., text). If staged encoding is performed on the part of the window that contains both contents, worse quality may result for the high quality image because the algorithm will treat both areas in the same manner even though the high quality part does not update as often as the video playback sub-portion.

Figure 8:
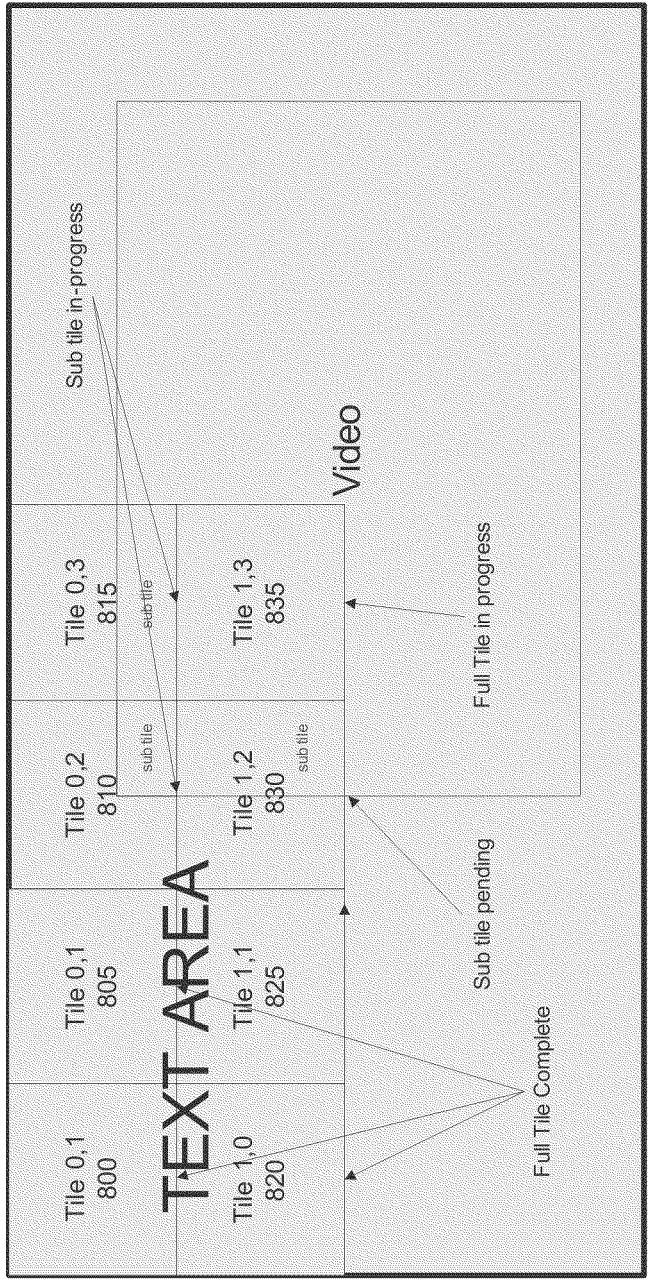
FIG. 8 illustrates an example of a screen with text and video sub-regions.

FIG. 8 illustrates an example diagram depicting a screen with different update rates. Tiles 0,0 (800); 0,1 (805); 1,0 (820); and 1,1 (825) contain text only which is not updated frequently. Tile 1,3 (835) is video only which is updated frequently. Tiles 0,2 (820); 0,3 (815); and 1,2 (835) are a mix of both. If the mixed tiles are treated as "text only," the video portion may be of high quality and static, i.e. the tile will not update as often as the "video" only tiles. If the mixed tiles are treated as "video only" and the bandwidth is reduced for sending the data, the text will be of lower quality than the text tiles.

Described herein is a system and method for encoding and decoding electronic information, and may include an encoding system with a tiling module that initially divides source image data into data tiles. A frame differencing module may then output only altered data tiles to various processing modules that convert the altered data tiles into corresponding tile components. In an embodiment, a quantizer may perform a compression procedure upon the tile components to generate compressed data according to an adjustable quantization parameter. An adaptive entropy selector may then select one of a plurality of available entropy encoders to perform an entropy encoding procedure to thereby produce encoded data. The entropy encoder may also utilize a feedback loop to adjust the quantization parameter in light of current transmission bandwidth characteristics. The process of compressing, encoding and decoding graphics data as referred to herein may generally use one or more methods and systems described in commonly assigned U.S. Pat. No. 7,460,725 entitled "System And Method For Effectively Encoding And Decoding Electronic Information" and U.S. application Ser. No. 12/399,302 entitled "Frame Capture, Encoding, And Transmission Management" filed on Mar. 6, 2009, hereby incorporated by reference in their entirety.

In various methods and systems disclosed herein, improvements to the processing and handling of the various processes described above may be used to provide more efficient processing and thus a more timely and rich user experience. The methods and systems also provide for improvements in providing such graphics support when the network and/or system resources become congested or otherwise less available. The embodiments disclosed herein for rendering, encoding and transmitting graphics data may be implemented using various combinations of hardware and software processes. In some embodiments, functions may be executed entirely in hardware. In other embodiments, functions may be performed entirely in software. In yet further embodiments, functions may be implemented using a combination of hardware and software processes. Such processes may further be implemented using one or more CPUs and/or one or more specialized processors such as a graphics processing unit (GPU) or other dedicated graphics rendering devices.

Figure 7:
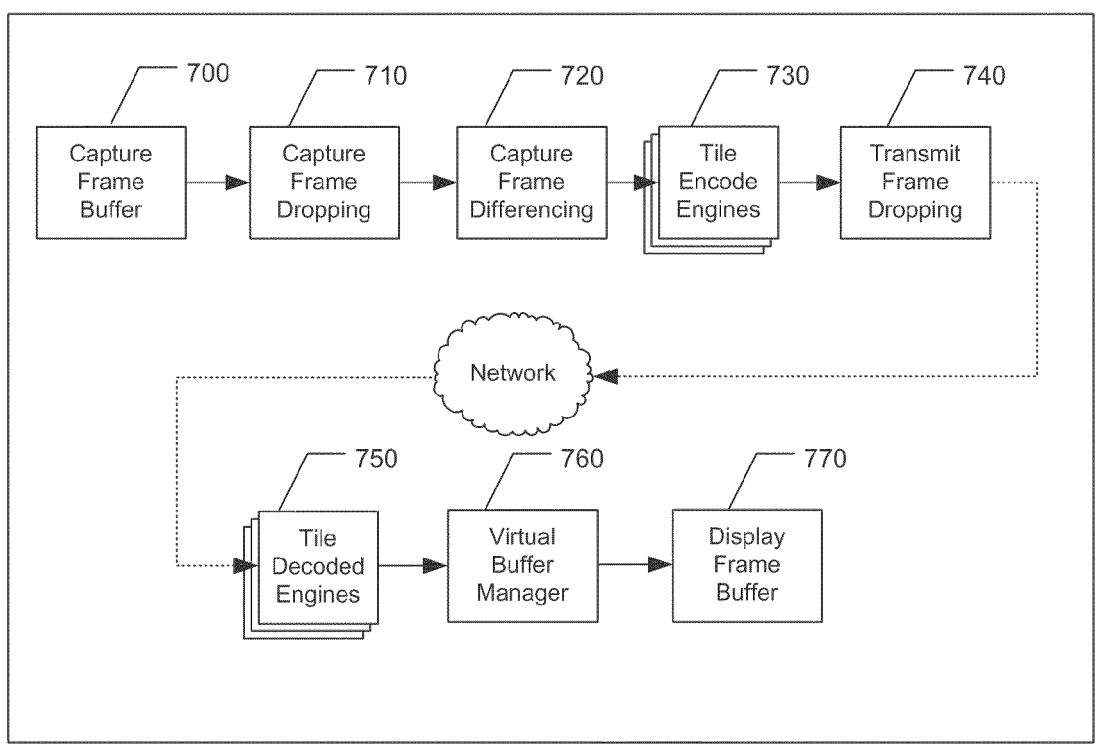
FIG. 7 illustrates an overview of some of the processes disclosed herein.

Referring to FIG. 7, illustrated is an overview of various functions associated with the rendering and encoding processes discussed herein. Various aspects of the illustrated process may be modified to improve the throughput and efficiency of the processes. Process 700 illustrates the capturing and buffering of a client frame. Process 710 illustrates that under certain circumstances it may be advantageous to drop a captured frame. The term dropping may include ignoring the captured data in favor of the next captured frame data, clearing the buffers of the captured data, and the like. Process 720 illustrates that the captured frame may be analyzed to determine if differences exist compared to the previously captured frame. Process 730 illustrates the process of encoding the changed tiles of a frame. Process 740 illustrates that under certain circumstances it may be advantageous to drop a frame that has been encoded and is ready to transmit. The term dropping may include ignoring the encoded data in favor of the next encoded frame, clearing the transmit buffers of the encoded data, and the like. Once transmitted, process 750 illustrates that the received tiles may be decoded. Process 760 illustrates that the receive buffers may be managed to track changed tiles. Process 770 illustrates that the display frame buffers may be used to drive the display controller in an efficient manner.

Various embodiments may incorporate the use of the discrete wavelet transform (DWT) function for transforming individual YUV components of the tiles into corresponding YUV the subbands. A quantizer function may perform a quantization procedure by utilizing appropriate quantization techniques to compress the tile subbands. The quantizer function may produce compressed image data by reducing the bit rate of the tiles according to a particular compression ratio that may be specified by an adaptive quantization parameter received via a feedback loop from an entropy encoder.

An entropy encoder function may perform an entropy encoding procedure to generate encoded data. In certain embodiments, the entropy encoding procedure further reduces the bit rate of the compressed image data by substituting appropriate codes for corresponding bit patterns in the compressed image data received from the quantizer.

In one embodiment, a GPU may be provided a bitmap with changed rectangles that need to be compressed. The bitmap may be further split into logical tiles and only tiles that change within the changed rectangle are encoded and compressed. In this manner, the process effectively implements a caching scheme in concert with the client where the resulting decoded image is maintained and displayed.

For more efficient usage of bandwidth for fast changing areas of the screen, in some embodiments the encoder may be staged so that only the image components that have the most perceivable effect on the resulting image are encoded and transmitted.

Figure 11:
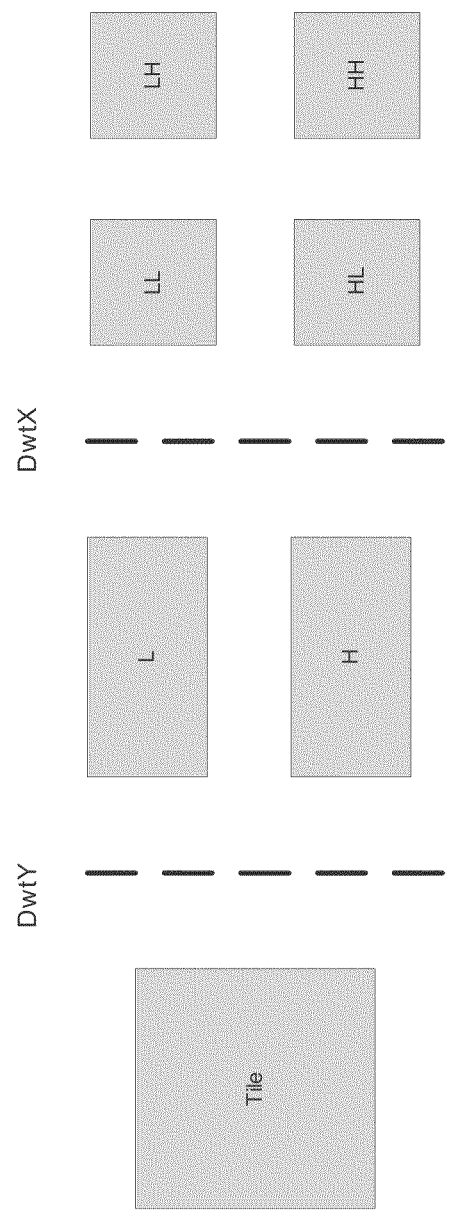
FIG. 11 illustrates an example of a discrete wavelet transformation process.
Figure 12:
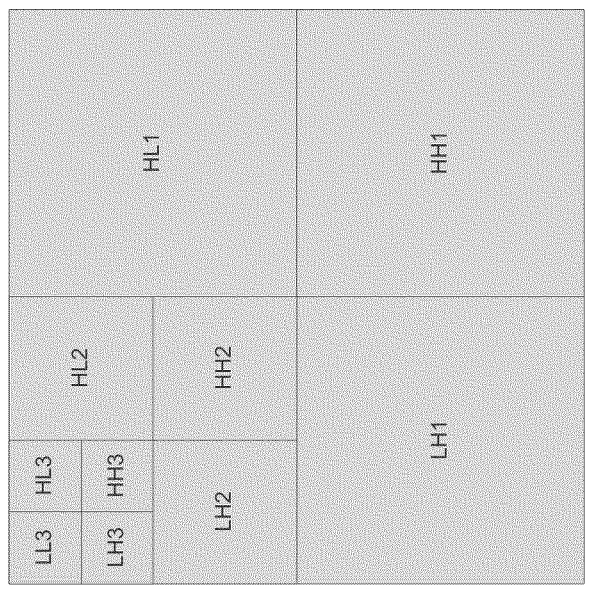
FIG. 12 illustrates an example of a discrete wavelet transformation process.

In discrete wavelet transformation, the image is typically filtered using high pass and low pass filters and the resulting image may comprise high-high, high-low, low-high, and low-low components. Such a process is depicted in FIGS. 11 and 12. Each of these components may in turn be filtered to produce set of sub-bands. The process may carried out three times resulting in ten different sub-bands. In one embodiment, entropy encoding can be performed on a selected subset of sub-bands and only the encoded subbands are transmitted. For example, only the level III sub-bands may be transmitted. On the receiving side, the decoding process may use zeroes for any sub-bands not received. While the resulting image may be blurry initially, the remaining sub-bands may be received in subsequent data frames. After the remaining sub-bands have been decoded and rendered, then the image may be completely rendered. In a further embodiment, if the encoded tile is the same tile as in a previous transmission, then the system can encode and send the level II and level III components and skip sending the level I components. By using these techniques the system can only perform the entropy encoding on the most needed components and thus reduce latencies from the encoding process which can a time consuming operation.

In one embodiment, the encoding process may be stopped until the tile is fully updated. Encoding can be resumed only for the parts of the tile that are being updated. In such scenarios it may not be advantageous to update the entire tile. In another embodiment, a mechanism may be provided that tracks the state of the tile. Each tile may be updated fully or partially. In some cases the tile may be in the process of being fully updated but not completed. In this case the text portion of the tile may be fully rendered and then the sub-region with the video component may be rendered.

Various means can be used to determine which areas of a screen are changing. For example, the screen scraper function in Remote Desktop Protocol (RDP) may be used to provide information on which sub-region is changing. Whenever an area of the screen changes, RDP drivers my provide the coordinates of the area that is changing.

In one embodiment, a three part process may be used to track and process screen areas with different update rates. First, the portion of the screen that contains a mix of fast and slow updated images may be identified. Second, the image that is updated more frequently may be tracked as a sub-region of the mixed image tile. Third, the process may ensure that the higher quality image is correctly sent before applying the scaled down sub-region of the fast updated image.

To further reduce bandwidth and computation, components of a tile may be processed and sent in a staged manner, recreating the image in two stages to recreate the tile with full fidelity. Staged encoding may be used on fast changing area of a screen, specifically those that render video or animation for efficient bandwidth usage. Only tiles and sub-regions of the tiles that have changes may be transformed using a DWT and quantization.

In an embodiment, the input image may be a Direct3D texture surface in the XRGB8 format. Video driver calls on a virtual machine may be translated to API calls on the host or parent partition, and a set of APIs may be provided such as the Microsoft DirectX set of APIs for handling tasks related to multimedia, in particular Direct3D which is the 3D graphics API within DirectX. A shader program may be loaded which reads from the input XRGB8 texture and outputs three surfaces, one each for Y, U and V, using the multiple render target (MRT) feature. MRT refers to the ability to render to multiple surfaces with a single draw call. An exemplary matrix used for the conversion is shown in Equation 1.

Equation 1: RGB to YUV Conversion Matrix $$[Y\ U\ V] = [R\ G\ B] \begin{bmatrix} 0.299f & -0.168935f & 0.499813f \\ 0.587f & -0.331665f & -0.418531f \\ 0.114f & 0.50059f & -0.081282f \end{bmatrix}$$

Figure 9:
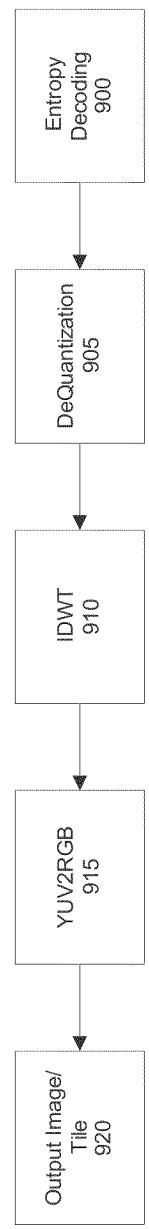
FIG. 9 illustrates an example of a decoding process.
Figure 10:
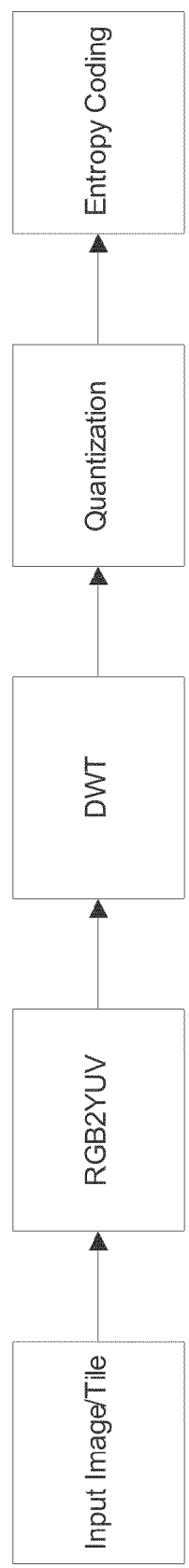
FIG. 10 illustrates an example of an encoding process.

In one embodiment and as illustrated in FIGS. 9 and 10, two sets of DWT shaders may be provided. One set may be configured for computing the DWT in the Y direction (DWTy) and another set for computing the DWT in the X direction (DWTx). For each level, the output of the DWTy shader may be used as input for the DWTx shader and the output of the DWTx shader may be used as input for the next level DWTy. The intermediate Direct3D surface types used for the DWT computation can be either RGBA16f or RGBA32f. RGBA16f may be used because of its lower memory and bandwidth requirements that nevertheless provides adequate precision. The input to the DWT process may be 8 bits for each component of a pixel and the DWT output coefficient may be at least 16 bits. The low and high pass DWT filter coefficients used in this embodiment are shown in Equation 2.

$$\text{LowPassFilterCoeffs} = \{-\tfrac{1}{8}\ \tfrac{1}{4}\ \tfrac{3}{4}\ \tfrac{1}{4}\ -\tfrac{1}{8}\}$$

$$\text{HighPassFilterCoeffs} = \{-\tfrac{1}{4}\ \tfrac{1}{2}\ -\tfrac{1}{4}\}$$

Equation 2

Forward Dwt Filter Coefficient

A shader may be provided that performs quantization and packing As discussed above, quantization is a process where each coefficient is scaled down by a predetermined factor. An assumption may be made that the three L1 bands (LH1, HL1, HH1) are scaled down to 8 bits or less. Even with this assumption, the reconstructed image has excellent image quality with PSNR>40 db (a PSNR of 35 db is considered very good). This assumption may be used to pack the output of a quantized tile down to 5 kb for a 64×64 tile and 20 kb for a 128×128 tile, as shown below in Table 1. Even if these bands require more than 8 bits per coefficient, each quantized tile would still be 8 kb for 64×64 tile or 32 kb for 128×128 tile. This may be performed to reduce the amount of data that needs to be read back to the CPU since readback is typically slower than upload for an exemplary GPU. The output of the quantization process may be three Direct3D Surfaces of type ARGB8, one for each of Y, U and V.

These surfaces may be read back to the CPU by using the D3d9 API calls GetRenderTargetData( ) and LockedRect( ).

TABLE 1

| Size of a tile after each encode stage | | | |
|---|---|---|---|
| Per Component | Rgb/Yuv | Dwt | Quantization |
| Tile Size 128 × 128 | 16 kb | 32 kb | 20 kb |
| Tile Size 64 × 64 | 4 kb | 8 kb | 5 kb |

After the quantized and packed surfaces are read back, each tile may be extracted and run through an RLGR encoder on the CPU. This may be performed for each of the three components and the encoded tile output can be generated.

In an embodiment, the GPU may be used as an offload engine to assist in the compression processing tasks. Thus in some of the embodiments disclosed herein, the GPU may be used as a coprocessor to assist in the compression process. The concurrent processing of data on the GPU and CPU may provide for lower latency in the end-to-end process.

In one embodiment, the software codec may be implemented across a programmable GPU and CPU. Such a process may enable overlapped processing on the GPU and CPU to complete the compression/decompression tasks, thus allowing for decreased processing time.

The table below illustrates one example embodiment listing where support for each stage of encoder may be implemented.

|  | CPU | GPU |
|---|---|---|
| RGB2YUV |  | ✓ |
| DWT |  | ✓ |
| Quantization |  | ✓ |
| Entropy Coding | ✓ |  |

Referring to FIG. 9, a block diagram illustrating a decoding process is shown, in accordance with one embodiment of the present disclosure. The encoding process is shown in FIG. 10. The encoded tile may be first run through an RLGR decoder 900 to generate a quantized tile coefficient. This may be performed on the CPU.

Dequantization 905 may be implemented on the CPU using SSE2 instructions. After dequantization, the ten subbands of the three components of the tile may be copied into three Direct3D texture buffers of format L16, one for each of Y, U and V. These three textures may be uploaded onto the GPU and can be used by the Inverse DWT stage 910 as input.

In an embodiment two shader programs may be provided, one for IDWT in the Y direction and one for IDWT in the X direction. For each level, the output of IDWT_X may be used as input for the IDWT_Y. Two surfaces may be used in a ping-pong fashion. Support for RGBA16f, RGBA32f and ARGB8 formats for these intermediate surfaces may be provided. The inverse DWT may use 16 bits of intermediate precision. This may be accomplished by explicitly splitting each output coefficient into the high byte and the low byte and merging them again on input. Equation 3 below indicates low and high pass filter coefficients that may be used.

$$\text{LowPassFilterCoeffs} = \{-\tfrac{1}{4}\ 1\ -\tfrac{1}{4}\}$$

$$\text{HighPassFilterCoeffs} = \{-\tfrac{1}{8}\ \tfrac{1}{2}\ \tfrac{3}{4}\ \tfrac{1}{2}\ -\tfrac{1}{8}\}$$

Equation 3

Inverse Dwt Filter Coefficients

The output surface which contains the IDWT tiles may then used as input to another shader program YUV2RGB (915) that may be provided that performs conversion from YUV to RGB. The output of this shader may be a surface in XRGB8|ARGB8 format and is the reconstructed image or tile 920.

The table below illustrates one example embodiment listing where each of decoder stages may be implemented.

TABLE 2

Processor Used Per Decoder Stage.

|  | CPU | GPU |
|---|---|---|
| Entropy Decoding | ✓ |  |
| Quantization | ✓ |  |
| IDWT |  | ✓ |
| YUV2RGB |  | ✓ |

To reduce bandwidth and computation, components of a tile may be processed and sent in a staged manner, recreating the image in two or more stages to recreate the tile with full fidelity while within each stage, the image quality may be improved. One objective is to provide the user at the client screen with sufficient and timely image information such that the human eye can perceive the image before the full quality image is received. To achieve when the screen has been captured, the corresponding data tiles may be processed and the DWT and the quantization steps described above may be performed. The entropy processing is not performed on all subbands. The encoder may order the components such that the decoder can produce a good quality image with minimal information extracted from the full image. For example, sending the image from level 3 to level 1 and sending the larger part of the chrominance component compared to the colored component can be one way of achieving the goal. In various embodiments, the exact order of components may vary. The following order of components may be considered:

| Component | Order |
|---|---|
| Subbands levels | level 3, level 2, level 1 |
| Color components | Chrominance (Y) first Cr and Cb are equal |
| Subband in a level | LL, HH, LH and HL are considered equal |

When sending data the entropy encoding may be performed only on those subbands that are to be transmitted. At the decoder, the received data may be entropy decoded, the missing subbands may be filled with zeroes, and the inverse DWT may be applied. Upon completion of these steps, the resulting image may be displayed. If the tile did not change, the encoder may send some or all of the remaining subbands and the process may be repeated until the tile is fully sent or changed. If the tile is changed, the encoder may discard any previous subbands and apply the process from the beginning In that case decoder may also discard all previously received data for that tile and begin the process again.

In some embodiments, areas or sub-regions of the screen with different update speeds may be tracked. When implementing the staged encoding process described above, sub-regions of the screen may be displayed with different quality depending on their update rates.

In one embodiment, one sub-tile or sub-region may be tracked. In other embodiments, any number of sub-tiles or sub-regions may be tracked. Each sub-tile or sub-region may be assigned one of the following states:

"Full tile in-progress"
"Sub-Tile in progress"
"Tile pending"
"Full Tile Complete"
"Sub-Tile Complete"

Initially, all tiles may be set to the "Full Tile Complete" state. When a screen is updated, the following state transitions are possible:

Any state→"Full tile in progress": the entire tile is being updated
"Full Tile Complete" or "Sub-Tile Complete"→"Sub-Tile in progress": if a sub-tile is updated
"Sub-Tile in progress"→"Sub-Tile in progress: if a sub-tile is updated and the sub-tile is the same as or overlaps with the currently updated sub-tile.
"Full tile in progress" or "Tile pending"→"Tile pending": if the sub-tile has been updated
"Full tile in progress"→"Sub-Tile in progress": if the full-tile update was fully transmitted
"Sub-Tile in progress"→"Sub-Tile completed": if the sub-tile update was fully transmitted
"Full tile in progress"→"Full tile completed": if the full-tile update was fully transmitted Updates may be sent based on the tile's state. If the tile is statused as "Full tile in progress" or "Tile pending", then the update may be sent for the entire tile. If the tile is statused as "sub-tile in progress" then the update may be sent just for the sub-tile.

Figure 13:
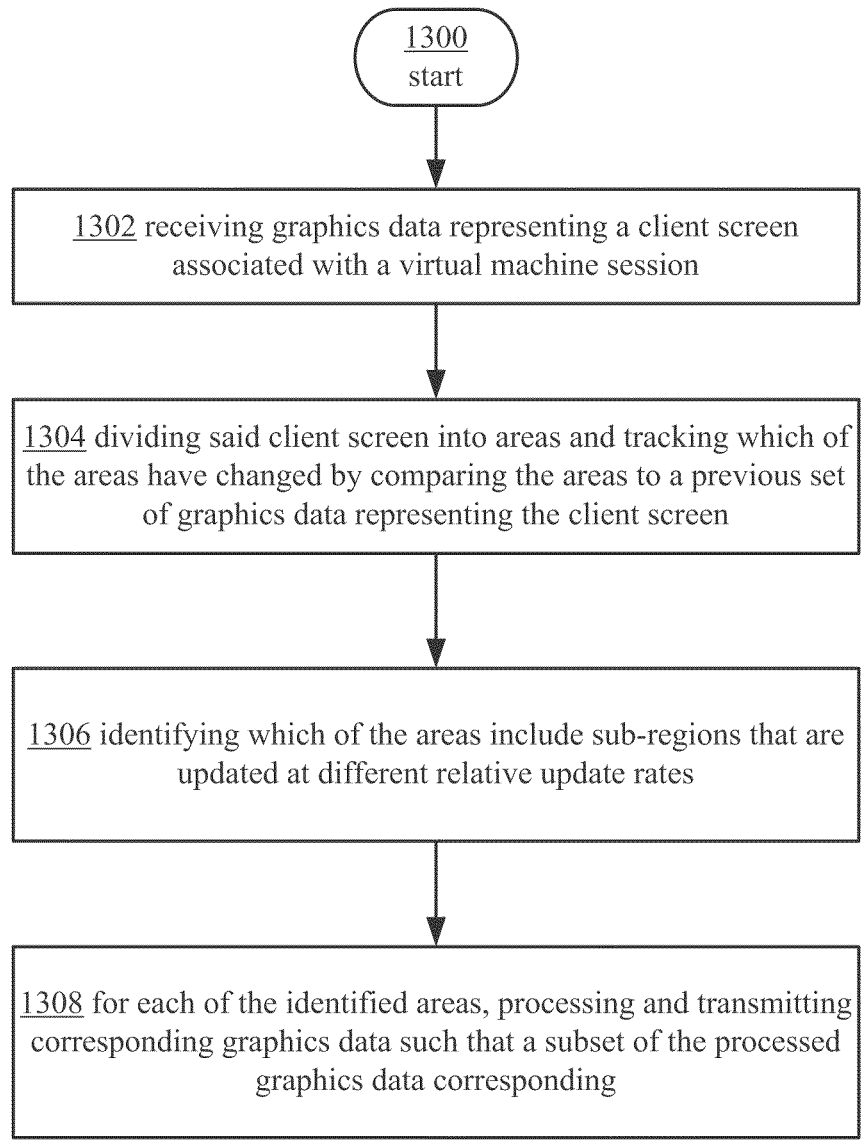
FIG. 13 illustrates an example of an operational procedure for processing graphics data for transmission to a client computer.

FIG. 13 depicts an exemplary operational procedure for processing graphics data for transmission to a client computer including operations 1300, 1302, 1304, and 1306. Referring to FIG. 13, operation 1300 begins the operational procedure and operation 1302 illustrates receiving graphics data representing a client screen associated with a virtual machine session. Operation 1304 illustrates dividing said client screen into areas and tracking which of the areas have changed by comparing the areas to a previous set of graphics data representing the client screen. Operation 1306 illustrates identifying which of the areas include sub-regions that are updated at different relative update rates. Operation 1308 illustrates for each of the identified areas, processing and transmitting corresponding graphics data such that a subset of the processed graphics data corresponding to sub-regions deemed to have a higher update rate are transmitted to the client computer.

Figure 14:
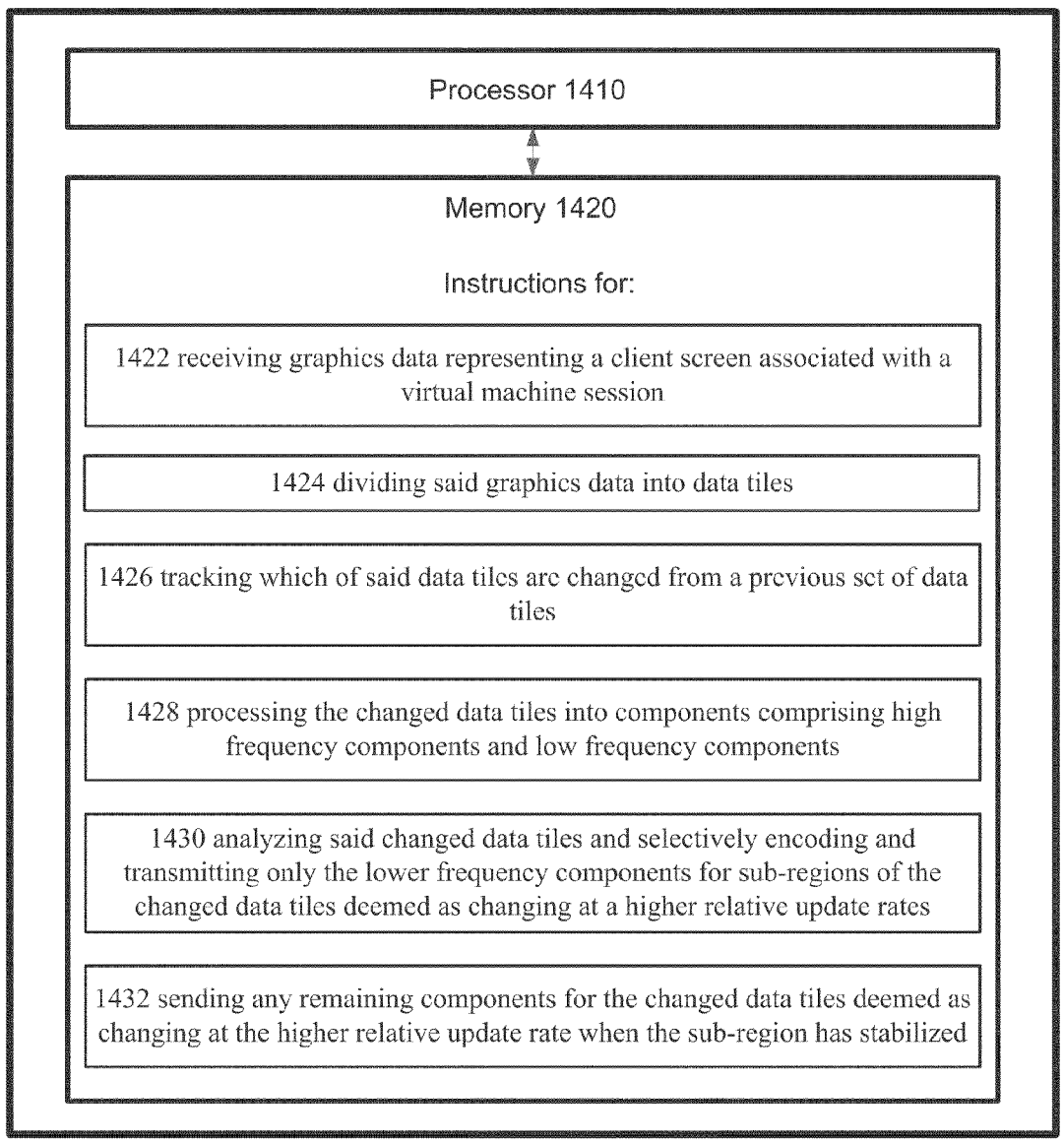
FIG. 14 illustrates an example system for processing graphics data for transmission to a client computer.

FIG. 14 depicts an exemplary system for processing graphics data for transmission to a client computer as described above. Referring to FIG. 14, system 1400 comprises a processor 1410 and memory 1420. Memory 1420 further comprises computer instructions configured to process graphics data for transmission to a plurality of client computers. Block 1422 illustrates receiving graphics data representing a client screen associated with a virtual machine session. Block 1424 illustrates dividing said graphics data into data tiles. Block 1426 illustrates tracking which of said data tiles are changed from a previous set of data tiles. Block 1428 illustrates processing the changed data tiles into components comprising high frequency components and low frequency components. Block 1430 illustrates analyzing said changed data tiles and selectively encoding and transmitting only the lower frequency components for sub-regions of the changed data tiles deemed as changing at a higher relative update rates. Block 1432 illustrates sending any remaining components for the changed data tiles deemed as changing at the higher relative update rate when the sub-region has stabilized.

Figure 15:
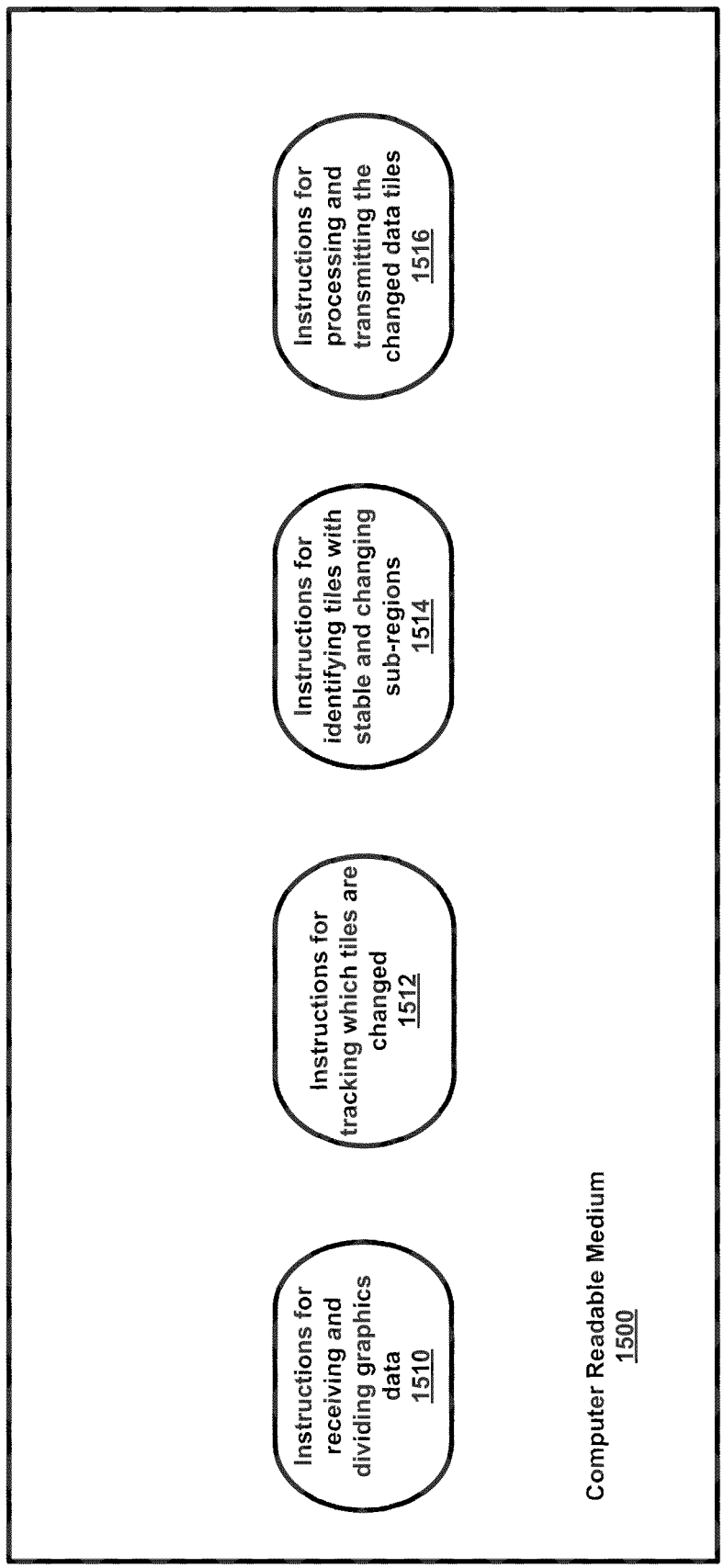
FIG. 15 illustrates a computer readable medium bearing computer executable instructions discussed with respect to FIGS. 1-14.

Any of the above mentioned aspects can be implemented in methods, systems, computer readable media, or any type of manufacture. For example, per FIG. 15, a computer readable medium can store thereon computer executable instructions for processing graphics data for transmission to a client computer. Such media can comprise a first subset of instructions for receiving graphics data representing a client screen associated with a virtual machine session and dividing said graphics data into data tiles 1510; a second subset of instructions for tracking which of said data tiles are changed from a previous set of data tiles 1512; a third subset of instructions for identifying which of the changed data tiles include stable and changing sub-regions and tracking the sub-regions 1514; and a fourth subset of instructions for processing and transmitting the changed data tiles as a function of the stable and changing sub-regions 1516. It will be appreciated by those skilled in the art that additional sets of instructions can be used to capture the various other aspects disclosed herein, and that the three presently disclosed subsets of instructions can vary in detail per the present disclosure.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed:

1. In a system comprising a processor and memory, a method for processing graphics data for transmission to a client computer, the method comprising:
   receiving graphics data representing a client screen associated with a virtual machine session;
   dividing said client screen into tiles and tracking which of the tiles have changed by comparing the tiles to a previous set of graphics data representing the client screen;
   identifying which of the tiles include sub-tiles that are updated at different relative update rates within the respective tile and tracking which of the sub-tiles are updated more frequently; and
   for the identified tiles, processing and transmitting corresponding graphics data in at least two stages such that a subset of the processed graphics data corresponding to sub-tiles deemed to have a higher update rate are transmitted to the client computer in a different stage than sub-tiles deemed to have a lower update rate.

2. The method of claim 1, wherein said processing comprises converting said graphics data into image components.

3. The method of claim 2, wherein the image components are YUV components.

4. The method of claim 2, wherein said processing further comprises performing a discrete wavelet transformation on said graphics data.

5. The method of claim 1, wherein said tiles comprise rectangles.

6. The method of claim 4, further comprising performing a quantization process on an output of said discrete wavelet transformation.

7. The method of claim 6, further comprising performing encoding on the output of the quantization process.

8. The method of claim 7, wherein said subset comprises processed graphics data having a most perceivable effect on a corresponding rendered image.

9. The method of claim 8, wherein said processed graphics data having a most perceivable effect comprises a higher one of levels resulting from said discrete wavelet transformation.

10. The method of claim 8, wherein said processed graphics data having a most perceivable effect comprises a chrominance component.

11. The method of claim 9, wherein said processed graphics data having a most perceivable effect comprises any one of a subband of said higher one of levels.

12. The method of claim 1 wherein all of the processed graphics data corresponding to sub-regions deemed to have a lower update rate are transmitted to the client computer.

13. A system configured to process data for processing graphics data for transmission to a client computer, comprising:
    at least one processor; and
    at least one memory communicatively coupled to said at least one processor, the memory having stored therein computer-executable instructions for:
    receiving graphics data representing a client screen associated with a virtual machine session;
    dividing said graphics data into data tiles;
    tracking which of said data tiles are changed from a previous set of data tiles;
    processing the changed data tiles into components comprising high frequency components and low frequency components; and
    analyzing said changed data tiles and encoding and transmitting the changed tiles in at least two stages by:
        selectively encoding only the low frequency components for sub-regions of the changed data tiles deemed as changing at a higher relative update rate; and
        sending any remaining components for the changed data tiles deemed as changing at the higher relative update rate in a different stage after transmitting the low frequency components.

14. The system of claim 13, further comprising performing a transformation on said data tiles.

15. The system of claim 14, further comprising performing a quantization process on an output of said transformation.

16. The system of claim 13, wherein said encoding is entropy encoding.

17. A computer readable storage device storing thereon computer executable instructions for processing graphics data for transmission to a client computer, said instructions for:
    receiving graphics data representing a client screen associated with a virtual machine session and dividing said graphics data into data tiles;
    tracking which of said data tiles are changed from a previous set of data tiles;
    identifying which of the changed data tiles include stable and changing sub-regions within the changed data tiles and tracking which of the sub-regions within the changed data tiles are updated more frequently; and
    processing and transmitting the changed data tiles in at least two stages as a function of the stable and changing sub-regions by processing and transmitting the stable sub-regions in a different stage than the changing sub-regions.

18. The computer readable storage device of claim 17, wherein a subset of the processed graphics data corresponding to sub-regions deemed to be changing are transmitted to the client computer.

19. The computer readable storage device of claim 17, wherein said processing comprises:
    performing a discrete wavelet transformation on the changed data tiles;
    performing a quantization process on an output of the discrete wavelet transformation; and
    performing entropy encoding on the output of the quantization process.

20. The computer readable storage device of claim 19, wherein the subset comprises a higher one of levels resulting from said discrete wavelet transformation.

* * * * *